United States Patent [19]

Miwa

[11] Patent Number: 5,187,900
[45] Date of Patent: Feb. 23, 1993

[54] AUXILIARY DEVICE FOR A MACHINE TOOL
[75] Inventor: Yuji Miwa, Chita, Japan
[73] Assignee: Brother Kogyo Kabushiki Kaisha, Nagoya, Japan
[21] Appl. No.: 765,816
[22] Filed: Sep. 26, 1991
[30] Foreign Application Priority Data
Nov. 26, 1990 [JP] Japan .................. 2-321833
[51] Int. Cl.⁵ .................. B24B 5/06; B24B 47/10
[52] U.S. Cl. .................. 51/95 WH; 51/240 T; 51/232; 51/227 R
[58] Field of Search ............... 51/91 R, 217 T, 217 S, 51/216 T, 236, 237 R, 237 M, 240 T, 230, 95 R, 95 WH, 103 R, 105 R, 281 P, 165.77, 165.93; 74/600, 45, 837

[56] References Cited

U.S. PATENT DOCUMENTS

| 2,779,137 | 1/1957 | Griscavage | 51/95 R |
|---|---|---|---|
| 2,803,148 | 8/1957 | Braskamp | 74/600 |
| 2,881,568 | 4/1959 | Hahn et al. | 51/95 WH |
| 3,054,225 | 9/1962 | Praeg | 51/95 R |
| 3,891,406 | 6/1975 | Yoshino | 51/105 R |
| 4,271,720 | 6/1981 | Jacob | 74/600 |
| 4,378,706 | 4/1983 | Miyamoto | 74/45 |
| 4,563,837 | 1/1986 | Ono | 51/240 T |
| 4,669,223 | 6/1987 | Schwär | 51/95 R |
| 4,771,578 | 9/1988 | Jorgensen et al. | 51/165.77 |
| 4,852,304 | 8/1989 | Honda et al. | 51/5 C |
| 4,993,196 | 2/1991 | Kobayashi et al. | 51/281 P |
| 5,042,202 | 8/1991 | Klein et al. | 51/281 P |

Primary Examiner—Bruce M. Kisliuk
Assistant Examiner—Bryan S. Reichenbach
Attorney, Agent, or Firm—Oliff & Berridge

[57] ABSTRACT

An auxiliary device for a machining tool that converts a standard rotary machining tool into an oscillation-machining tool. The device has a chuck, or other workpiece gripping device, at an upper end of a shaft. The shaft may be rotated around an axis parallel to the axis of the rotary machining tool and may be oscillated along the rotary axis. The degree of oscillation may be adjusted dependent on the length of the surface to be machined.

8 Claims, 4 Drawing Sheets

AUXILIARY DEVICE FOR A MACHINE TOOL

BACKGROUND OF THE INVENTION

1. Field of the Invention

The present invention relates to an auxiliary device for a machine tool for supporting a workpiece to be machined by the machine tool.

2. Description of the Related Art

In surface-finishing a workpiece W having a hollow portion, as shown in FIGS. 3A, 3B or 3C, the workpiece W is ground. A tool with a shaft, as illustrated in FIG. 4, is used for grinding the workpiece W. Diamond abrasive grains are deposited at the tip end of the tool T. As depicted in FIG. 5, the tool T abuts against the inner surface of the workpiece W while rotating at a high speed, thereby realizing internal grinding of the workpiece W.

It is known that, in the above mentioned surface finish, if the tool T is reciprocated in the axial direction, indicated by a double-headed arrow D in FIG. 5 (this type of machining is hereinafter referred to as "oscillation-machining"), surface roughness can be reduced as well as machining efficiency can be enhanced. The reciprocation of the tool T is performed at about 100 cycle/min. The width of the reciprocation of the tool T is limited within the range where the diamond abrasive grains deposited in the tool T can be brought into contact with the surface of the workpiece W to be machined from the upper end to the lower end thereof.

Conventionally, a special machine tool such as an internal grinding machine or a jig grinding machine is used for the oscillation machining. The internal grinding machine or jig grinding machine has an oscillation function for reciprocating the tool T in the axial direction. Accordingly, the surface finishing of the workpiece W, using the internal grinding machine or jig grinding machine, can sufficiently reduce the surface roughness of the workpiece W. However, since the internal grinding machine or jig grinding machine is manufactured to correspond to the shape of the workpiece W to be machined, the internal grinding machine or jig grinding machine is very expensive and, further, it is not generally compatible with a popular multi-tool machining center and numerical control milling machine. Consequently, oscillation machining using the internal grinding machine or jig grinding machine is expensive.

SUMMARY OF THE INVENTION

An object of the invention is to provide an auxiliary device for a machine tool capable of performing oscillation machining at a low cost.

Another object of the invention is to provide an auxiliary device for a machine tool capable of adding an oscillation function to a general machine tool.

To achieve the above and other objects, an auxiliary device for a machine tool according to the invention comprises holding means for holding a workpiece, a main shaft connected to the holding means, first support means for reciprocably supporting the main shaft in the axial direction thereof, and first drive means for reciprocating the main shaft in the axial direction thereof.

In the auxiliary device for the machine tool according to the invention, the workpiece can be held by the holding means. The holding means is connected to the main shaft. The main shaft is reciprocably supported in the axial direction thereof by the first support means and the main shaft is reciprocated in the axial direction by the first drive means. As a result, the workpiece held by the holding means is reciprocated. Consequently, the auxiliary device according to the invention is mounted on a table of the machine tool to reciprocate the workpiece, thereby realizing the oscillation machining.

In the auxiliary device for the machine tool according to the invention as described above, the workpiece can be reciprocated so that the oscillation function can be added to the general machine tool. Therefore, the precise surface finish can be performed at a low cost by the use of the machining center and NC fraise, or the like, without using any special grinding machine having the oscillation function such as the conventional internal grinding machine.

BRIEF DESCRIPTION OF THE DRAWINGS

A preferred embodiment of the invention will be described in detail with reference to the following figures, wherein.

DESCRIPTION OF THE PREFERRED EMBODIMENT

Figure 1:
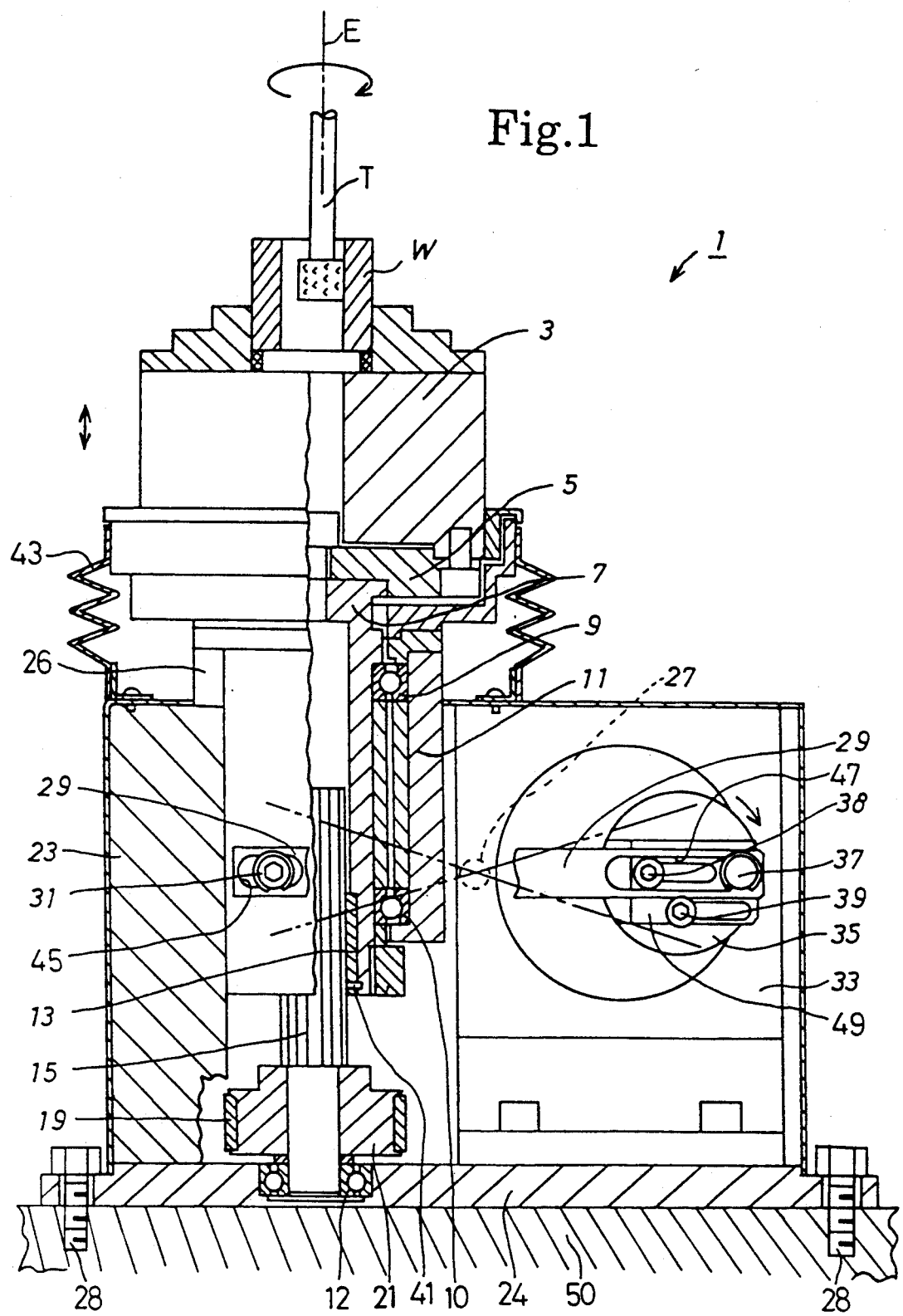
FIG. 1 is a front cross-sectional view showing an auxiliary device for a machine tool in an embodiment according to the present invention.
Figure 2:
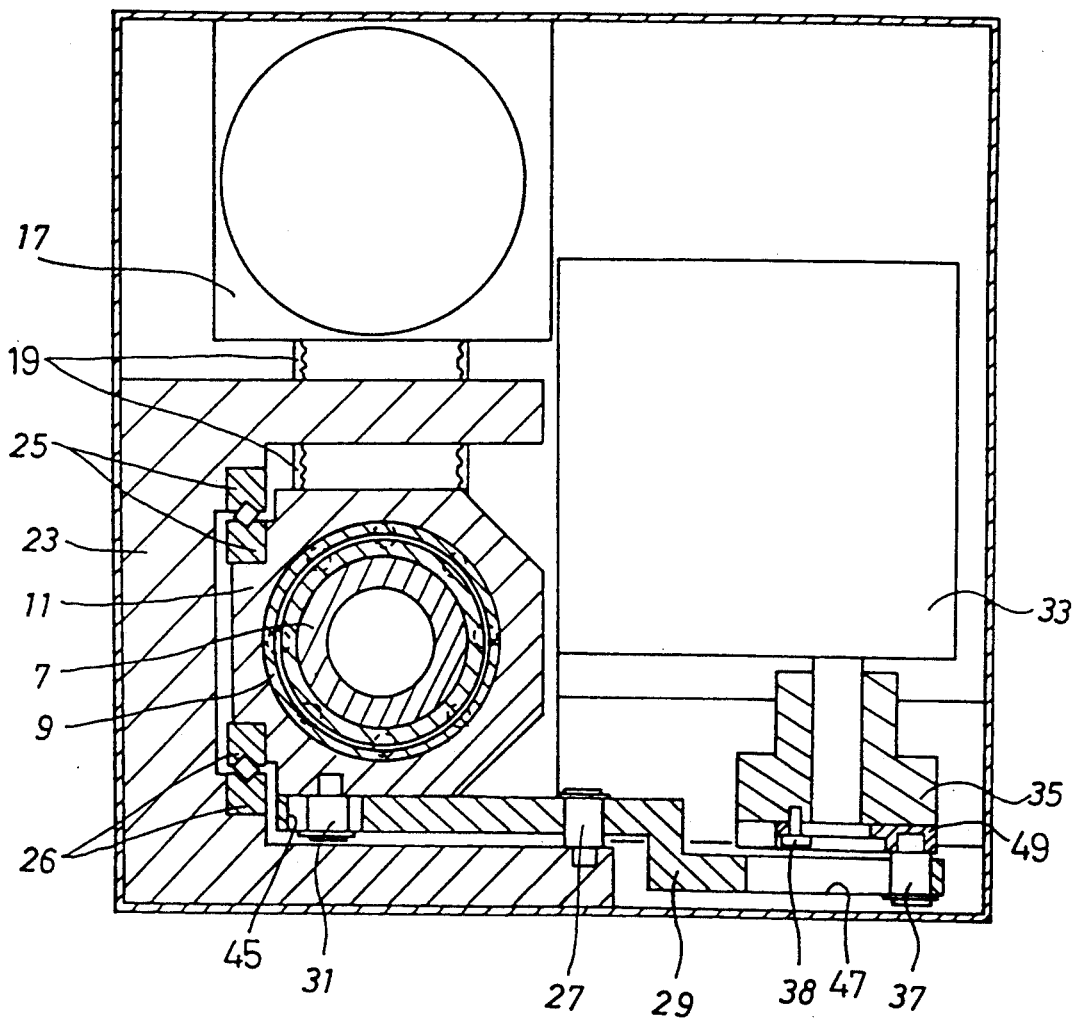
FIG. 2 is a plan cross-sectional view of an auxiliary device for a machine tool.

An auxiliary device for a machine tool in a preferred embodiment according to the present invention will be explained with reference to FIGS. 1 and 2. The base frame 24 of the auxiliary device 1 for the machine tool is detachably disposed on the machining table 50 of the machine tool by bolts 28. On the base frame 24 is mounted a main frame 23. In the main frame 23, a housing 11 is movably supported via cross roller guides 25, 26 in the vertical direction, i.e., in the direction parallel to an axis E of rotation of a tool T with a shaft of the machine tool.

Inside the housing 11, a hollow main shaft 7 is rotatably housed via bearings 9, 10 on an axis parallel to the axis E of rotation of the tool T. At the upper end of the main shaft 7 is secured a flange 5 on which a chuck 3 is disposed for holding a workpiece W. A spline nut 13 is fixed inside the main shaft 7 by a stop ring 41. A spline shaft 15 is engaged with the spline nut 13. The lower end of the spline shaft 15 is rotatably supported by a bearing 12 contained inside the base frame 24. Under the spline shaft 15 is arranged a pulley 21 connected to the rotary shaft of a rotation motor 17, shown in FIG. 2, via a belt 19. Consequently, the rotation of the rotation motor 17 is transmitted to the spline shaft 15 through the belt 19 and the pulley 21. As a result, the workpiece W held by the chuck 3 can be rotated integrally with the main shaft 7 on the axis parallel to the axis E of rotation of the tool T. The rotation motor 17 is an inductive motor.

Moreover, the intermediate portion of a crank arm 29 is rotatably attached to the main frame 23 via a pin 27. In the right and left ends of the crank arm 29 are formed elongated holes 47, 45, respectively. The left end of the crank arm 29 is rotatably connected to the housing 11 through a pin 31 inserted into the elongated hole 45. A cam 35 is secured to the rotary shaft of an oscillation motor 33 constituted of an inductive motor. An adjustment plate 49 is fixed by screws 38, 39 to the cam 35 in such a manner that the position thereof can be adjusted in the lateral direction. The right end of the crank arm 29 is rotatably connected to the adjustment plate 49 by a pin 37 inserted into the elongated hole 47. The combination of the adjustment plate 49 and cam 35 produce an eccentric cam. Accordingly, the crank arm 29 can be oscillated, as illustrated by a two-dot chain line in FIG. 1, on the pin 27 with rotation of the oscillation motor 33. As a result, the workpiece W held by the chuck 3 can be reciprocated integrally with the housing 11 in parallel to the axis E of rotation of the tool T.

In addition, a change in fixture position of the adjustment plate 49 with respect to the cam 35 leads to a change in position of the pin 37 with respect to the crank arm 29, thereby varying the oscillation range of the crank arm 29. Consequently, the adjustment of the fixture position of the adjustment plate 49 with respect to the cam 35 enables the reciprocal oscillation of the workpiece W to be adjusted.

A bellows 43 made of elastic rubber is interposed between the main frame 23 and the flange 5, to prevent any adverse effect on the inside of the main frame 23 even if the flange 5 is vertically reciprocated with respect to the main frame 23.

In the auxiliary device 1 of the machine tool in the preferred embodiment according to the present invention, so constituted as described above, the rotation of the rotation motor 17 is transmitted to the chuck 3 through the belt 19, pulley 21, spline shaft 15, spline nut 13, main shaft 7 and flange 5 upon drive of the rotation motor 17. Meanwhile, upon drive of the oscillation motor 33, the rotation of the oscillation motor 33 is transmitted to the pin 37 via the cam 35 and adjustment plate 49 (eccentric cam). The rotation of the pin 37 is converted into the oscillation by the crank arm 29. The vertical component of the oscillation of the crank arm 29 is transmitted to the chuck 3 through the pin 31 and housing 11. Therefore, the housing is vertically reciprocated along the cross roller guides 25, 26.

Figure 3C:
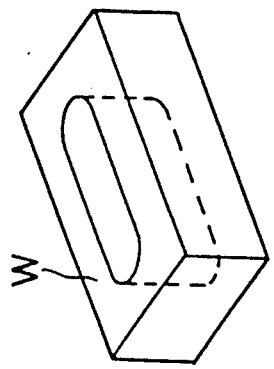
FIG. 3C is a perspective view of a third type of workpiece.
Figure 3B:
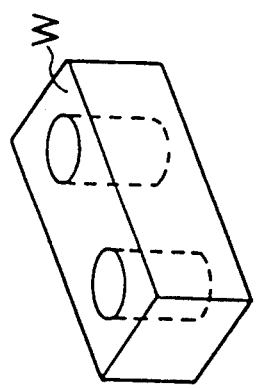
FIG. 3B is a perspective view of a second type of workpiece.
Figure 3A:
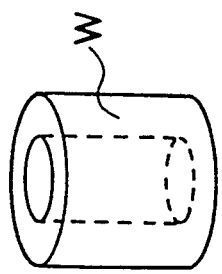
FIG. 3A is a perspective view of one type of workpiece.
Figure 4:
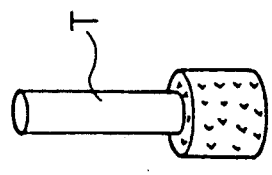
FIG. 4 is a perspective view of a tool.
Figure 5:
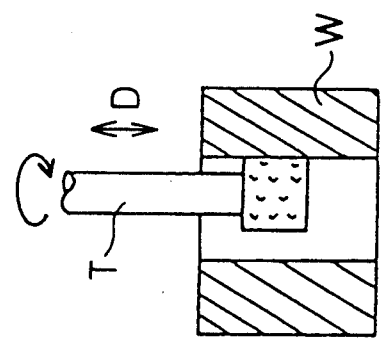
FIG. 5 is a view of assistance in explaining a conventional machining method.

For example, in oscillation-machining, the inner circumferential surface or outer peripheral surface of a cylindrical workpiece W, depicted in FIG. 3A, the workpiece W is held by the chuck 3 and the rotation motor 17 and oscillation motor 33 are driven. The tool T rotated by the machine tool abuts the workpiece W. Consequently, the workpiece W is reciprocated while being rotated in contact with the rotated tool T, to be thus oscillation-machined at the inner circumferential surface or outer periphery surface thereof. The auxiliary device 1 not only reciprocates but also rotates workpiece W held by the chuck 3. Accordingly, the tool T of the machine tool or the table 50 need not be moved along the circumference in the oscillation-machining of the inner circumferential surface or outer periphery surface of the cylindrical workpiece W. As a result, the workpiece W can be oscillation-machined at high circularity without the necessity of complicated control.

Furthermore, for example, in oscillation-machining a workpiece W having flat portions at the inner circumferential surface or outer periphery surface thereof, of, as illustrated in FIG. 3C, only the oscillation motor 33 is driven so that only reciprocation is applied to the workpiece W. In the oscillation-machining the flat portions, the tool T of the machine tool or the table 50 is moved along the flat portions.

The rotational speeds of the rotation motor 17 and oscillation motor 33 are determined according to the material of the workpiece W. The fixture position of the adjustment plate 49 with respect to the cam 35, that is, the reciprocal oscillation is adjusted according to the length in the direction of reciprocation of the surface to be machined of the workpiece W. If the workpiece W is made of hardened steel and a circumferential speed of the tool T is 1,000 m/min, the rotational speed and reciprocal speed of the workpiece W are adjusted to about 100rpm and about 200 cycle/min, respectively.

According to the auxiliary device 1 of the machine tool in the preferred embodiment, the workpiece W can be oscillation-machined using a general machine tool such as a multi-tool machining center and a numerical control milling machine without any special grinding machine having an oscillation function to reciprocate the tool T in the axial direction, e.g., an inner grinding machine and jig grinding machine in the conventional manner.

The present invention is not limited to the embodiment described above and many modifications and variations can be made without departing from the spirit or scope of the invention.

For example, although the inductive motor is employed as the rotation motor 17 in the above-mentioned embodiment, a servo motor may be used as the rotation motor 17. If the servo motor is used as the rotation motor 17, the position of rotation of the main shaft 7 can be precisely found. Therefore, the position of rotation of the workpiece W can be precisely determined.

In addition, the workpiece W may be automatically exchanged by disposing an automatic clamp mechanism in the chuck 3.

Moreover, the oscillation motor 33 may be replaced with an air cylinder or a hydraulic cylinder, to be servo-controlled. The use of the air cylinder or hydraulic cylinder enables the housing 11 to be directly reciprocated. Accordingly, a movement converting mechanism such as the crank arm 29 in the aforementioned embodiment becomes unnecessary, thus simplifying the structure of the auxiliary device.

What is claimed is:

1. An auxiliary device for a machine tool, comprising:
a machining table;
holding means for holding a workpiece;
a hollow main shaft connected to said holding means;
a rotary shaft partially enclosed by said hollow main shaft;
first support means mounted to said machining table for reciprocally supporting said hollow main shaft in an axial direction thereof;
first drive means for reciprocating said main shaft in an axial direction thereof;
second support means for rotatably supporting said hollow main shaft;
second drive means for rotating said rotary shaft; and
connecting means for transferring rotation from said rotary shaft to said hollow main shaft.

2. The auxiliary device for a machine tool according to claim 1, further comprising range adjusting means for adjusting a range of reciprocation imparted to said main shaft by said first drive means.

3. An auxiliary device for a machine tool having a machining table for use with a rotatable tool, comprising:
   a frame detachably mounted on said machine table;
   holding means for holding a workpiece;
   a main shaft having said holding means mounted to one end;
   a rotary shaft for rotating said main shaft while permitting said main shaft to be reciprocated axially with respect to said rotary shaft;
   first support means for reciprocally supporting said main shaft in the direction parallel to an axis of rotation of said tool, said first support means being provided in said frame;
   first drive means for reciprocating said main shaft;
   second support means for rotatably supporting said main shaft on an axis parallel to the axis of rotation of said tool, said second support means being provided in said frame;
   second drive means for rotating said rotary shaft; and
   range adjusting means for adjusting a range of reciprocation of said main shaft.

4. An auxiliary workpiece holding device for use with a machining tool, comprising:
   a base;
   a frame mounted to said base;
   a housing mounted within said frame;
   a first shaft rotatably mounted to said base within said housing;
   a second shaft mounted within said housing and enclosing said first shaft, said second shaft axially slidable relative to said first shaft and rotatable together with said first shaft;
   a gripping means for holding a workpiece mounted to an upper end of said second shaft opposite to where said first shaft is enclosed;
   means for rotating said first shaft; and
   means for applying an axial sliding movement to said second shaft as required, wherein said housing is axially slidably with respect to said first shaft.

5. The auxiliary workpiece holding device according to claim 4, wherein said means for applying an axial sliding movement to said second shaft comprises:
   an eccentric cam;
   a lever, at a point between a first end and a second end of the lever, pivotally mounted to said frame, at the first end to an edge of said eccentric cam, and at the second end to said housing.

6. The auxiliary workpiece holding device according to claim 5, wherein said eccentric cam comprises a cam and an adjustment plate, said first end of said lever is pivotally mounted to said adjustment plate which is adjustably mounted to said cam, whereby a range of slide of said second shaft can be adjusted upon an adjustment of said adjustment plate.

7. The auxiliary workpiece holding device according to claim 5, wherein said means for rotating said first shaft includes a first motor, and wherein said means for axially sliding said second shaft includes a second motor connected to said eccentric cam and rotating said eccentric cam.

8. The auxiliary workpiece holding device according to claim 1, wherein said first support means is a main frame and said second support means is a housing.

* * * * *